F. CARLISLE.
DIFFERENTIAL MECHANISM.
APPLICATION FILED JAN. 30, 1917.
1,229,883.
Patented June 12, 1917.
2 SHEETS—SHEET 2.
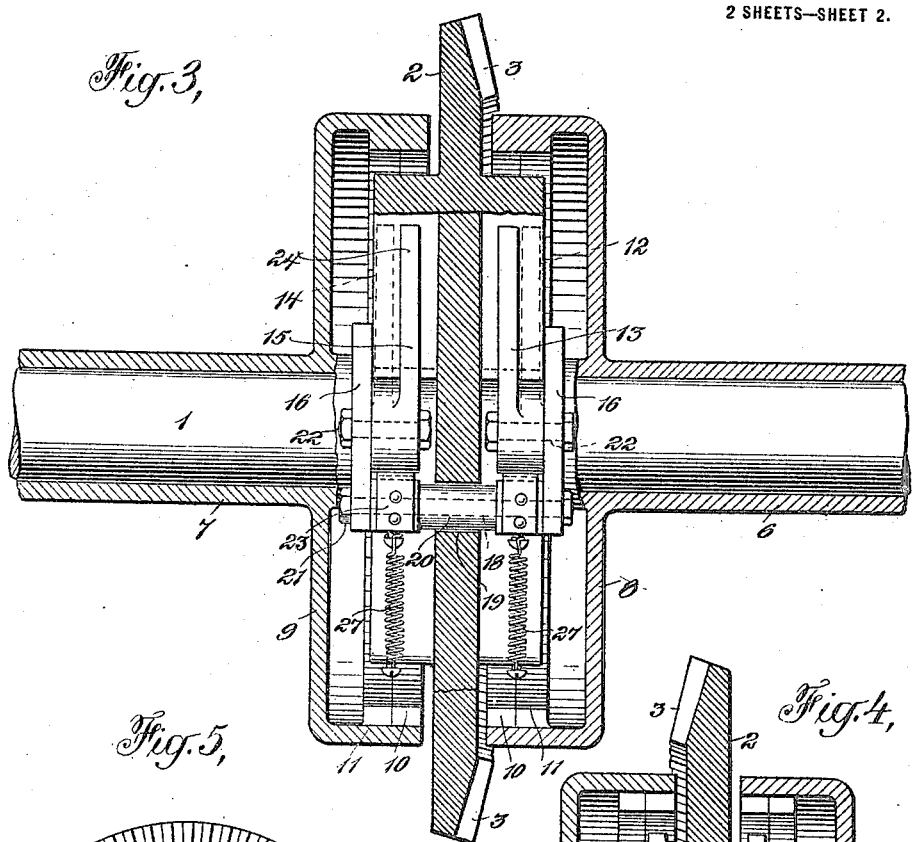
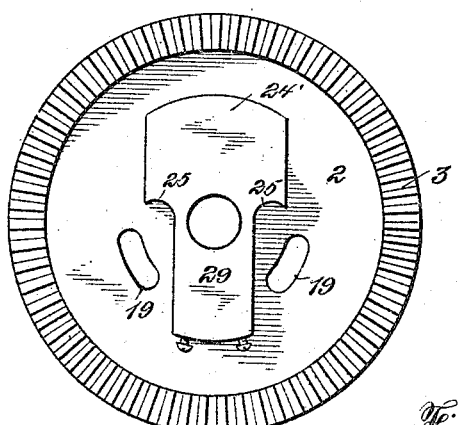
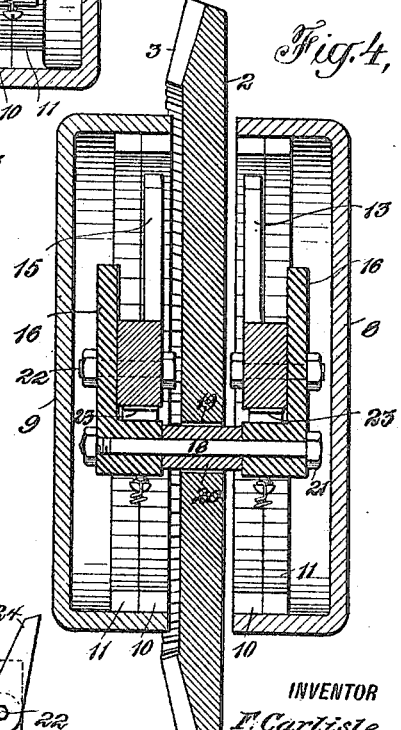
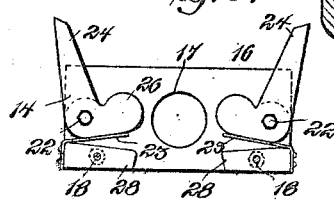
WITNESSES
L. Hauerstein
S. Bradway
INVENTOR
F. Carlisle.
BY Munn & Co
ATTORNEYS

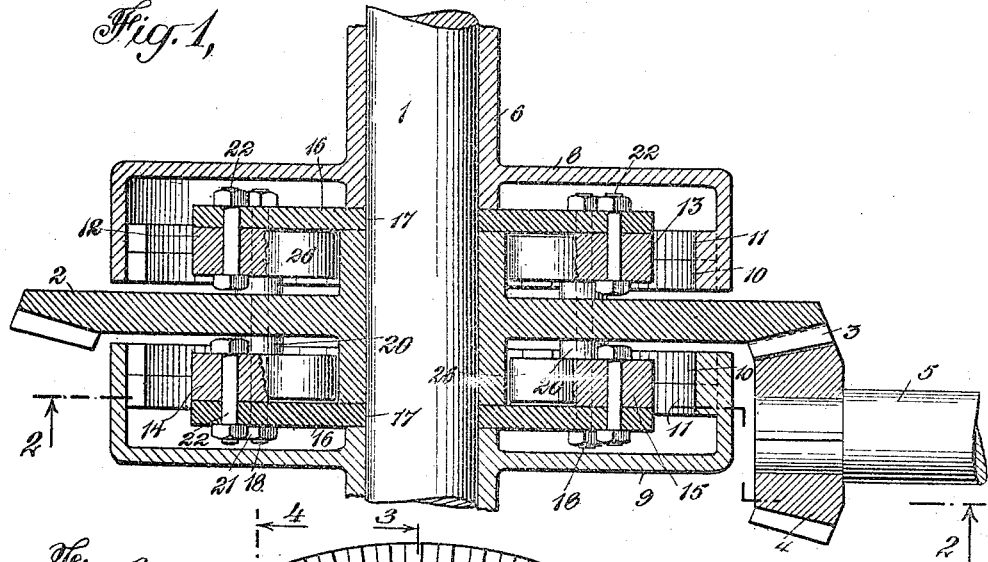
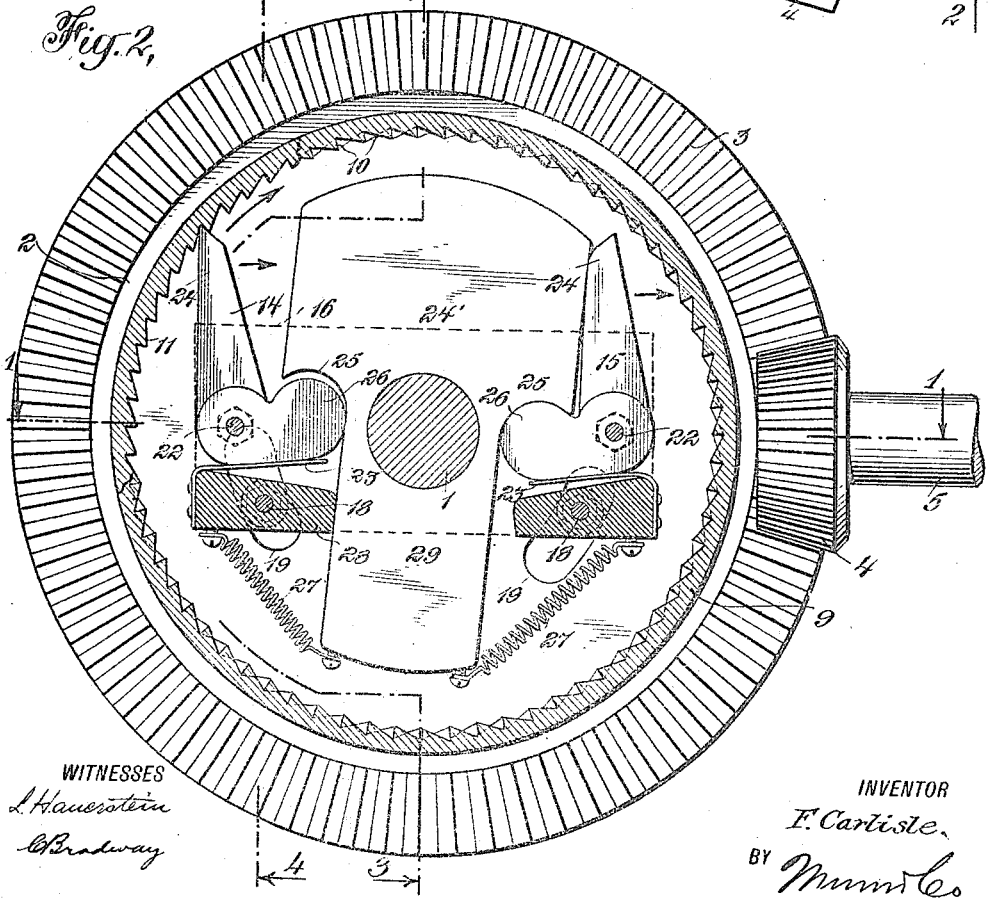

UNITED STATES PATENT OFFICE.

FREDERICK CARLISLE, OF MONTICELLO, NEW YORK.

DIFFERENTIAL MECHANISM.

1,229,883.  Specification of Letters Patent.  Patented June 12, 1917.

Application filed January 30, 1917. Serial No. 145,417.

*To all whom it may concern:*

Be it known that I, FREDERICK CARLISLE, a citizen of the United States, and a resident of Monticello, in the county of Sullivan and State of New York, have invented a new and Improved Differential Mechanism, of which the following is a full, clear, and exact description.

This invention relates to differential mechanisms especially adapted although not limited to automobiles.

The invention has for its general objects to improve the construction and operation of differential mechanisms so as to be reliable and efficient in use, comparatively simple and inexpensive to manufacture, and so designed that there will be a positive application of power to the driving wheels during forward or rearward propulsion, or while turning.

A more specific object of the invention is the provision of a differential mechanism in which the master wheel or driving element is operatively connected by ratchet and pawl means with the driven elements that are connected with the traction wheels of the automobile, whereby power is available at all times at one or both wheels for propelling the car; or in other words, it is impossible for the power to be concentrated on one wheel, as when the same slips on an icy or muddy surface, which is one of the objections to the present type of gear differential mechanisms.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a horizontal section on the line 1—1, Fig. 2;

Fig. 2 is a vertical section taken on the line 2—2, Fig. 1;

Fig. 3 is a sectional view on the line 3—3, Fig. 2;

Fig. 4 is a sectional view on the line 4—4, Fig. 2;

Fig. 5 is a side view of the master gear or driving element; and

Fig. 6 is a side view of one of the sets of pawls.

Referring to the drawing, 1 designates the rear axle of an automobile on which is rotatably mounted the master gear or driving element 2 of the differential mechanism, such element having beveled gear teeth 3 which mesh with the teeth of a pinion 4 on the propeller shaft 5 of the automobile. Mounted on the axle 1 are the hollow shafts 6 and 7, to which the traction wheels of the automobile are rigidly connected, and the inner ends of these shafts are formed with disks 8 and 9 which have peripheral flanges that are each formed with two sets of ratchet teeth 10 and 11. Within the driven element 8 are pawls 12 and 13, and in the driven element 9 are pawls 14 and 15. Each set of pawls is carried by a plate 16 which has a central opening 17 through which the axle 1 extends and whereby the plates are loosely mounted on the axle. The plates 16 are rigidly connected together by means of bolts 18 which pass through the plates and also pass through arcuate slots 19 in the driven element 2, there being on the bolts between the plates 16, sleeves 20 against which the plates are clamped by the tightening of the nuts 21 on the bolts. Each pawl swings on a pivot 22, and a leaf or equivalent spring 23 bears against each pawl and tends to throw the gripping end 24 thereof into engagement with the ratchet teeth on the driven elements. It will be noted that the pawls of each set are mounted at opposite sides of the axle and they are thrown outwardly to operative position in opposite directions by the respective springs. One pawl of each set is adapted to engage one row of ratchet teeth on its associated driven element and the other pawl is adapted to engage the other row of ratchet teeth so that one pawl is employed to drive a driven element forwardly and the other pawl to drive the driven element rearwardly. The pawls are thrown automatically into and out of engaging position by an initial movement of the driven element or master gear, and for this purpose opposite sides of the master gear have hubs 24', each of which has at opposite sides of the axle surfaces 25 adapted to engage the heels 26 of the pawls. When the master gear is moved in a clockwise direction, Fig. 2, from a neutral position, the pawl 15 is retracted from the ratchet teeth 11 and the pawl 14 is released and its spring 23 throws it into engagement with the ratchet teeth 10, so that the driven element 9 will be rotated with the master gear. The same effect takes place on the opposite side of the master gear, so that the driven element 8 will be rotated forwardly or in a clockwise direction. When the master gear is turned in an anticlockwise direction the pawl 15 is released, so that it will engage the ratchet teeth 11, and the pawl 14 will be released so that driven elements will rotate with the master gear in an anticlockwise or reverse direction. If desired, helical extension springs 27 may be connected with the plates 16 and hub extensions of the master gear, so as to tend to centralize the parts when no power is being applied to the master gear. On the plates 16 are spaced abutments 28 between which the tongue portions 29 of the hub extensions engage, whereby the pawl supporting plates will be connected by lost motion connections with the master gear, this lost motion being provided to enable one pair of pawls to be retracted while the others are permitted to move to operative or engaging position, and when thus engaged the hub extensions by contacting with the abutments 28 carry the plates 16 around with the master gear.

It will be understood that when the automobile is traveling forwardly or rearwardly in a more or less straight line, both traction wheels will be driven at the same rate and with the same power. When turning a corner the traction wheel at the greatest distance from the center of turning will revolve at a higher rate of speed, and the ratchet teeth of the driven element connected therewith will ride freely over the engaging pawl, whereas the driven element connected with the wheel nearest the center of turning will be connected through the engaging pawl and ratchet teeth with the master wheel, so as to transmit the propelling power to such traction wheel. In case one of the traction wheels encounters a soft spot or icy surface in the road, the propelling power will be applied equally to both wheels so that the car will not become stalled, as will be the case where gears are employed in differential mechanism.

From the foregoing description taken in connection with the accompanying drawings, the advantages of the construction and method of operation will be readily understood by those skilled in the art to which the invention appertains, and while I have described the principle of operation, together with the mechanism which I now consider to be the best embodiment thereof, I desire to have it understood that the mechanism shown is merely illustrative and that such changes may be made when desired as fall within the scope of the appended claims.

Having thus described my invention, I claim as new and desire to secure by Letters Patent:

1. A differential mechanism comprising a driving element, a pair of driven elements having ratchet teeth, a set of oppositely acting pawls associated with each driven element, a carrying means for the pawls, lost motion connection between the carrying means and the driving element, means for throwing the pawls into engagement with their associated ratchet teeth, and means on the driving element engageable with one pawl of each set during the initial movement of the driving element in either direction for holding such engaged pawls released from the ratchet teeth.

2. A differential mechanism comprising a driving element, a pair of driven elements having teeth, a set of oppositely acting pawls associated with the teeth of each driven element, a plate supporting each set of pawls, springs acting on the pawls and tending to throw the same outwardly into engagement with the associated teeth, means connecting the plates together, a lost motion connection between the driving element and plates, and means on the driving element for engaging one pawl of each set and releasing the other pawl, whereby the driven elements will be connected with the driving element through the released pawls engaging the said teeth.

3. A differential mechanism comprising a driving element, carriers disposed at opposite sides thereof, a set of pawls movably mounted on each carrier, means for connecting the carriers together, driven elements having surfaces engageable by the pawls, means tending to throw the pawls outwardly into engagement with the said surfaces, and means on the driving element for releasing one pawl of each set and permitting the other pawl of each set to move to operative position.

4. A differential mechanism comprising a driving element, carriers disposed at opposite sides thereof, a set of pawls movably mounted on each carrier, means for connecting the carriers together, driven elements having surfaces engageable by the pawls, means tending to throw the pawls outwardly into engagement with the said surfaces, means on the driving element for releasing one pawl of each set and permitting the other pawl of each set to move to operative position, and a supporting axle passing through the driving and driven elements and on which the said carriers are mounted.

FREDERICK CARLISLE.